US009405549B2

(12) United States Patent
Igura

(10) Patent No.: US 9,405,549 B2
(45) Date of Patent: Aug. 2, 2016

(54) DEADLOCK AVOIDANCE METHOD AND DEADLOCK AVOIDANCE MECHANISM

(75) Inventor: Hiroyuki Igura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 391 days.

(21) Appl. No.: 14/003,166

(22) PCT Filed: Oct. 26, 2011

(86) PCT No.: PCT/JP2011/006003
§ 371 (c)(1),
(2), (4) Date: Sep. 4, 2013

(87) PCT Pub. No.: WO2012/120573
PCT Pub. Date: Sep. 13, 2012

(65) Prior Publication Data
US 2013/0346732 A1 Dec. 26, 2013

(30) Foreign Application Priority Data

Mar. 4, 2011 (JP) ................................. 2011-047907

(51) Int. Cl.
G06F 9/30 (2006.01)
G06F 9/38 (2006.01)
G06F 9/52 (2006.01)

(52) U.S. Cl.
CPC .............. *G06F 9/3861* (2013.01); *G06F 9/524* (2013.01)

(58) Field of Classification Search
CPC ..... G06F 9/3861; G06F 9/524; G06F 9/3877; G06F 9/3879; G06F 9/3885; G06F 9/30181; G06F 9/3836; G06F 9/30
See application file for complete search history.

(56) References Cited

U.S. PATENT DOCUMENTS 4,791,554 A * 12/1988 Hirota ................... G06F 9/524
5,568,644 A * 10/1996 Nelson ................. G06F 9/4812
710/268

(Continued)

FOREIGN PATENT DOCUMENTS

JP 2002-503370 A 1/2002
JP 2002-73332 A 3/2002
JP 2004-234420 A 8/2004

(Continued)

OTHER PUBLICATIONS

International Search Report for PCT Application No. PCT/JP2011/006003 mailed on Jan. 31, 2012.

Primary Examiner — Farley Abad

(57) ABSTRACT

A processor core interrupt control circuit issues a request signal for requesting cancellation of a coprocessor instruction being executed at a coprocessor. A program control circuit issues interrupt processing after issuance of the cancellation request. A coprocessor computation control circuit retains the execution state of the coprocessor instruction. Upon receiving the processing cancellation request signal, a coprocessor interrupt control circuit performs cancellation or holding of the coprocessor instruction on the basis of execution state information retained by the coprocessor computation control circuit. The coprocessor interrupt control circuit evicts the execution state of the coprocessor instruction in the case of holding, and restores the execution state of the coprocessor instruction that had been evicted after completion of the interrupt processing.

9 Claims, 10 Drawing Sheets

(56) References Cited

U.S. PATENT DOCUMENTS

| | | | | |
|---|---|---|---|---|
| 6,327,476 B1 * | 12/2001 | Koscal | ............... | H04W 24/00 455/462 |
| 7,840,776 B1 * | 11/2010 | Kelly | ............... | G06F 9/3808 711/200 |
| 2004/0044878 A1 * | 3/2004 | Evans | ............... | G06F 9/3842 712/34 |
| 2005/0060577 A1 * | 3/2005 | Barrett | ............... | G06F 9/30032 726/4 |
| 2011/0153987 A1 * | 6/2011 | Luke | ............... | G06F 9/30181 712/207 |

FOREIGN PATENT DOCUMENTS

| | | |
|---|---|---|
| JP | 2005-92467 A | 4/2005 |
| JP | 2009-271610 A | 11/2009 |

\* cited by examiner

DEADLOCK AVOIDANCE METHOD AND DEADLOCK AVOIDANCE MECHANISM

This application is a National Stage Entry of PCT/JP2011/006003 filed Oct. 26, 2011, which claims priority from Japanese Patent Application 2011-047907 filed Mar. 4, 2011, the contents of all of which are incorporated herein by reference, in their entirety.

TECHNICAL FIELD

The present invention relates to a deadlock avoidance method and a deadlock avoidance mechanism.

BACKGROUND ART

In recent years, in order to improve flexibility of processing, there has increased an LSI (Large Scale Integration) in which a dedicated coprocessor is connected to a built-in processor core to perform signal processing.

In the LSI in which the coprocessor core and the processor are connected to each other, a coprocessor 20 and a data memory 30 can be directly connected to each other as shown in FIG. 5. The coprocessor 20 directly performs read and write of data with respect to the data memory 30. As a result of this, data traffic of a processor core 10 is reduced, and performance can be improved.

For example, Patent Literature 1 discloses a configuration in which data is directly transferred between a coprocessor and a data memory.

For example, the following methods are included in techniques to generate an address required for data exchange between the coprocessor and the data memory etc.

(1-1) A method in which a data transfer circuit in the coprocessor automatically generates the address (1-2) A method for directly embedding an address value in an instruction (hereinafter referred to as a coprocessor instruction) issued to the coprocessor (1-3) A method for embedding an update parameter of the address value in the coprocessor instruction (1-4) A method for appropriately supplying the address from a processor core Among the above-described methods, "(1-1) The method in which the data transfer circuit in the coprocessor automatically generates the address" has a high processing efficiency, and has a high efficiency of a control program. Hereinafter, a coprocessor in an LSI in which the method is employed will be described with reference to FIG. 6. A data transfer circuit 23 in the coprocessor automatically generates an address using a data transfer parameter 231. The data transfer circuit 23 reads data from the data memory 30 using the generated address. The data transfer circuit 23 writes the read data in an arithmetic unit 22 through a data input FIFO (First In First Out) 25. The arithmetic unit 22 performs arithmetic operation using the input data, and writes an arithmetic result in a data output FIFO 26 and the data transfer circuit 23.

When an address is automatically generated in the data transfer circuit 23, a parameter for address generation (a data transfer parameter) is set to the data transfer circuit 23, and after that, a series of coprocessor instructions are issued. The data transfer circuit 23 generates the address using the data transfer parameter 231 in synchronization with the issue of the coprocessor instructions. After address generation, the data transfer circuit 23 performs data write or data read in or from the data memory 30. Each configuration of the LSI is implemented so that the above-mentioned operation is performed.

When the data transfer circuit 23 in the coprocessor 20 generates the address, a plurality of data transfer parameter settings may be required for the data transfer circuit 23 depending on complexity of the address to be generated. When the address to be generated does not vary, and it is simple, setting of the data transfer parameter may just be performed only once. However, for example, when an address is irregularly changed in the middle of execution of the coprocessor instruction, resetting of the data transfer parameter is required during execution of the coprocessor instruction.

For example, the following methods are included in methods for resetting a data transfer parameter.

(2-1) A method for repeatedly execute each processing included in a coprocessor instruction, repeatedly halting processing in a timing required for address change, and setting a data transfer parameter.

(2-2) A method for generating interrupt to a coprocessor in a timing of changing an address, and setting a data transfer parameter in interrupt processing The above-mentioned method of (2-1) will be described with reference to FIG. 7. As shown in FIG. 7, a coprocessor repeatedly executes a coprocessor instruction (loop processing in S22). In the timing when an address is changed, a data transfer parameter is set from outside (S21). When this method is employed, it is necessary to generate a control program in consideration of the timing of address change. Therefore, there is such a problem that when the address is irregularly changed in the middle of execution of the coprocessor instruction, the control program becomes complicated.

Subsequently, the method of (2-2) will be described with reference to FIGS. 8 and 9. First, there will be described general operation in a case where interrupt processing is executed to a coprocessor with reference to FIG. 8.

In the case where interrupt processing to the coprocessor is performed during execution of a coprocessor instruction, when the interrupt processing is executed before the end of the coprocessor instruction, problems, such as resource mismatch inside the coprocessor, may occur. Therefore, interrupt processing is suspended until the coprocessor instruction is ended as shown in FIG. 8.

For example, Patent Literature 2 discloses a technology in which when external interrupt is generated during processing of a vector instruction, processing of the external interrupt is suspended until the processing of the vector instruction is ended. As a result of this, an arithmetic result of the vector instruction is prevented from being an illegal value.

Subsequently, the method of (2-2) will be described with reference to FIG. 9. As shown in FIG. 9, interrupt is generated at a timing when a parameter for address generation needs to be reset (S43). As a result of this, a control program of an LSI can be simplified.

However, this method causes such a problem that deadlock may occur. The problem will be described with reference to FIG. 10. As described with reference to FIG. 8, in order to avoid resource mismatch, interrupt processing is generally executed after the program waits until the end of the coprocessor instruction. Therefore, interrupt processing is not executed until the end of the coprocessor instruction (S51). Meanwhile, since interrupt processing is not executed, parameter setting of a data transfer circuit is not executed (S52). Since the parameter setting is not executed, data acquisition (access to a data memory) by the coprocessor instruction being executed cannot be executed (S53). Therefore, the coprocessor instruction is not ended (S54). As described above, a deadlock state occurs.

Patent Literature 3 discloses a technology to eliminate deadlock due to the program continuing to wait until data is held in a buffer in performing stream data. In the technology, when timeout occurs, deadlock is avoided by inserting dummy data in an FIFO buffer that holds the stream data. Namely, a configuration is disclosed in which processing is forcibly executed for each certain time.

CITATION LIST

Patent Literature

[Patent Literature 1]
Published Japanese Translation of PCT International Publication for Patent Application, No. 2002-503370
[Patent Literature 2]
Japanese Unexamined Patent Application Publication No. 2005-092467
[Patent Literature 3]
Japanese Unexamined Patent Application Publication No. 2009-271610

SUMMARY OF INVENTION

Technical Problem

In the technology of Patent Literature 3, deadlock is avoided by continuing processing after occurrence of timeout, i.e., after a certain latency time. Since the certain latency time occurs, processing cannot be quickly executed by the technology of Patent Literature 3.

Consequently, the present invention is mainly directed to situations as in the above-mentioned (1-1) and (2-2). Namely, the present invention is directed to a situation where processing to the coprocessor is performed by interrupt processing during execution of the coprocessor instruction. As mentioned above, interrupt processing is not executed until the coprocessor instruction is ended in order to avoid resource mismatch in the coprocessor. Therefore, in a general LSI configuration, deadlock may occur in processing being performed to the coprocessor (the parameter for address generation being set in the above-mentioned example).

The present invention is made with respect to the above-described problem, and a main object thereof is to avoid deadlock in a processor system that performs processing to a coprocessor by interrupt processing during execution of a coprocessor instruction.

Solution to Problem

In a first exemplary aspect of the present invention, a deadlock avoidance method, wherein a cancellation request that requests cancellation of a coprocessor instruction being executed in a coprocessor is issued from a processor core, and in the coprocessor that has received the cancellation request, an execution state of the coprocessor instruction being executed is determined, the coprocessor instruction is canceled or suspended according to the determination, and the execution state of the coprocessor instruction is saved in the coprocessor instruction being suspended, after that, interrupt processing that performs processing to the coprocessor instruction is executed, and the saved execution state of the coprocessor instruction is restored after end of the processing.

In a second exemplary aspect of the present invention, a deadlock avoidance mechanism comprising a processor core and a coprocessor, wherein the processor core comprises: a processor core interrupt control circuit that issues a cancellation request that requests cancellation of a coprocessor instruction being executed in the coprocessor; and a program control circuit that starts interrupt processing that performs processing to the coprocessor after issuance of the cancellation request, and wherein the coprocessor comprises: a coprocessor arithmetic control circuit that holds an execution state of the coprocessor instruction; and a coprocessor interrupt control circuit that cancels or suspends the coprocessor instruction based on information that the coprocessor arithmetic control circuit holds in receiving the cancellation request, saves the execution state of the coprocessor instruction when the coprocessor instruction is suspended, and restores the saved execution state of the coprocessor instruction after end of the interrupt processing.

Advantageous Effects of Invention

According to the present invention, can be provided a deadlock avoidance method and a deadlock avoidance mechanism that can avoid deadlock in a processor system that performs processing to a coprocessor by interrupt processing during execution of a coprocessor instruction.

DESCRIPTION OF EMBODIMENTS

Embodiment 1

Figure 1:
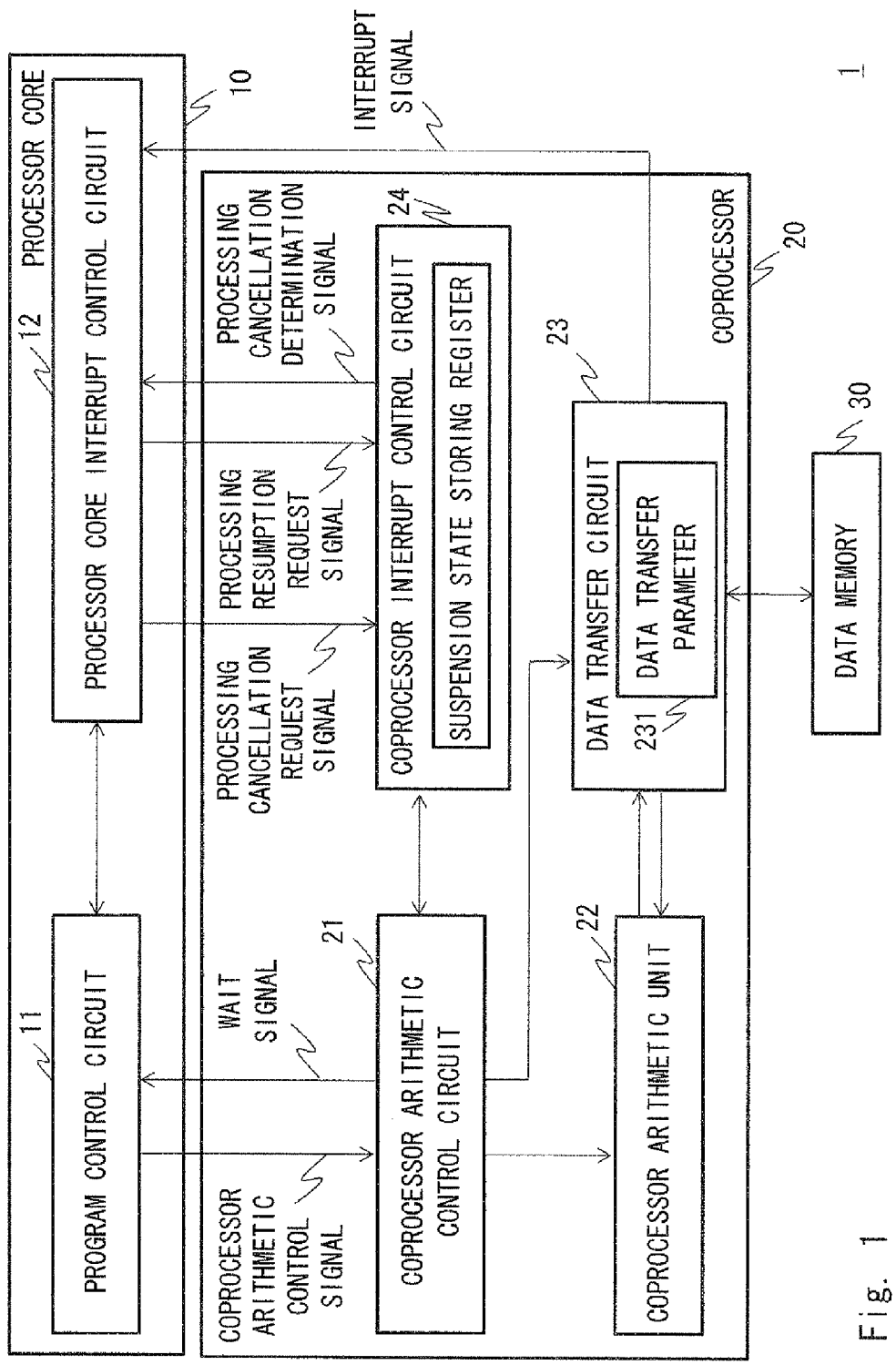
FIG. 1 is a block diagram showing a configuration of a deadlock avoidance mechanism pertaining to an embodiment 1.

Hereafter, an embodiment of the present invention will be described with reference to drawings. A deadlock avoidance mechanism 1 pertaining to the embodiment includes: a processor core 10, a coprocessor 20; and a data memory 30. The deadlock avoidance mechanism 1 is incorporated in an LSI (Large Scale Integration) for signal processing that is used for cell-phone terminals or AV (audio-visual) equipment, etc.

The processor core 10 includes: a program control circuit 11; and a processor core interrupt control circuit 12.

The program control circuit 11 issues a coprocessor instruction or interrupt processing to the coprocessor 20 as a coprocessor arithmetic control signal. When there is no supply of a wait signal from a coprocessor arithmetic control circuit 21, the program control circuit 11 can perform the issue. The coprocessor instruction is an instruction that generally has a plurality of cycles. The interrupt processing is processing to reset a data transfer parameter 231 in the embodiment.

The program control circuit 11 holds a status indicating whether or not the coprocessor instruction (instruction to the coprocessor 20) is being executed. It is to be noted that the program control circuit 11 can hold not only the above-described two types of statuses but various statuses. The program control circuit 11 notifies the processor core interrupt control circuit 12 of the held status according to a query from the processor core interrupt control circuit 12.

When notified of start of interrupt processing by the processor core interrupt control circuit 12, the program control circuit 11 notifies the coprocessor arithmetic control circuit 21 of a processing content of the interrupt processing for resetting the data transfer parameter 231.

When the data transfer parameter 231 needs to be reset, the processor core interrupt control circuit 12 queries the program control circuit 11 of a current status, i.e., whether or not the coprocessor instruction is being executed. The data transfer parameter 231 is reset, for example, in an interrupt signal being supplied from a data transfer circuit 23. Details of the data transfer parameter 231 will be mentioned later. When the coprocessor instruction is being executed, the processor core interrupt control circuit 12 supplies a processing cancellation request signal to the coprocessor interrupt control circuit 24.

The processor core interrupt control circuit 12 receives a processing cancellation determination signal from the coprocessor interrupt control circuit 24 as a response of a processing cancellation request signal. The processing cancellation determination signal is a determination signal indicating whether the coprocessor instruction has been suspended or the coprocessor instruction has been canceled. The processor core interrupt control circuit 12 stores the received determination signal. The processor core interrupt control circuit 12 then notifies the program control circuit 11 of the start of the interrupt processing.

The processor core interrupt control circuit 12 performs resumption indication of the coprocessor instruction, or reissue of the coprocessor instruction, after interrupt processing is ended. When the stored determination signal is the signal related to suspension, the processor core interrupt control circuit 12 supplies a processing resumption request signal to the coprocessor interrupt control circuit 24. When the stored determination signal is the signal related to cancellation, the processor core interrupt control circuit 12 reissues the canceled coprocessor instruction through the program control circuit 11.

It is to be noted that the program control circuit 11 need not necessarily reissue the canceled coprocessor instruction, and may determine whether to reissue it according to the held status.

The coprocessor 20 includes: the coprocessor arithmetic control circuit 21; a coprocessor arithmetic unit 22; the data transfer circuit 23; and the coprocessor interrupt control circuit 24.

The coprocessor arithmetic control circuit 21 supplies a wait signal to the program control circuit 11, when the coprocessor instruction is being executed. The coprocessor arithmetic control circuit 21 makes the coprocessor arithmetic unit 22 execute processing of each cycle included in the coprocessor instruction.

Furthermore, when notified of interrupt processing, the coprocessor arithmetic control circuit 21 notifies the data transfer circuit 23 of the processing content of the interrupt processing, and makes it reset the data transfer parameter 231.

The coprocessor arithmetic control circuit 21 supplies the wait signal to the program control circuit 11 also during execution of the interrupt processing.

The coprocessor arithmetic control circuit 21 holds an execution situation as a status (hereinafter also described as a processing status) during execution of the coprocessor instruction. In the processing status, included is information, such as the number of steps currently being executed, whether or not data write has been performed in an external storage section (the data memory 30 or an arbitrary register (not shown)), and information of a pair of address information of the storage section to which data write has been performed and a written value.

The coprocessor arithmetic control circuit 21 supplies to the coprocessor interrupt control circuit 24 a processing status signal including information on the processing status according to a query from the coprocessor interrupt control circuit 24.

When a processing suspension signal or a processing cancellation signal is input from the coprocessor interrupt control circuit 24, the coprocessor arithmetic control circuit 21 ends the coprocessor instruction currently being executed. When receiving a processing resumption signal and a processing resumption status signal from the coprocessor interrupt control circuit 24, the coprocessor arithmetic control circuit 21 resumes the coprocessor instruction from an execution situation according to the processing resumption status signal.

The coprocessor arithmetic unit 22 is the arithmetic unit that executes each cycle of the coprocessor instruction. The coprocessor arithmetic unit 22 performs read and write of data through the data transfer circuit 23, when the data memory 30 needs to be accessed.

The data transfer circuit 23 performs access to the data memory 30 according to a request of the coprocessor arithmetic unit 22. The data transfer circuit 23 generates an address that is required for access to the data memory 30 using the data transfer parameter 231.

The data transfer parameter 231 is a parameter utilized in the address required for access to the data memory 30 being generated. Information, such as address initial value, the upper limit number of transfer, an address difference, is included in the data transfer parameter 231.

The address initial value is information indicating an initial value in the data transfer circuit 23 accessing the data memory 30. The upper limit number of transfer is the maximum number of transfer (read or write of data) to the data memory 30. When data transfer is performed the maximum number of times, the data transfer parameter 231 needs to be reset. The address difference is a difference between a recently accessed address and an address to be accessed next.

When resetting of the data transfer parameter 231 needs to be performed, the data transfer circuit 23 supplies an interrupt signal to the processor core interrupt control circuit 12.

Figure 2:
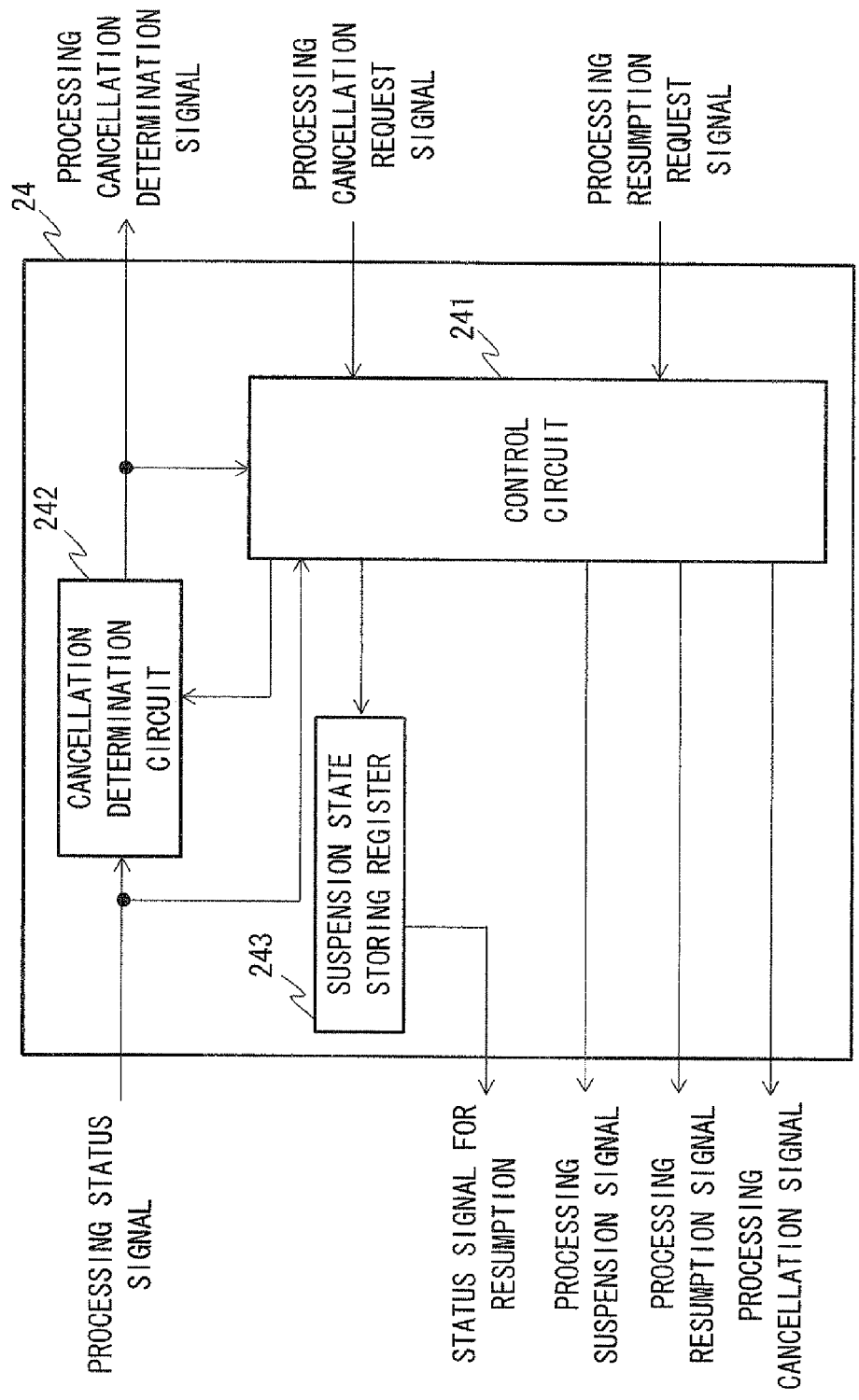
FIG. 2 is a block diagram showing a configuration of a coprocessor interrupt control circuit 24 pertaining to the embodiment 1.

The coprocessor interrupt control circuit 24 controls interrupt processing. There will be described details of a configuration and operation of the coprocessor interrupt control circuit 24 with reference to FIG. 2.

The coprocessor interrupt control circuit 24 includes: a control circuit 241; a cancellation determination circuit 242; and a suspension state storing register 243.

The control circuit 241 instructs start of cancellation determination to the cancellation determination circuit 242, when a processing cancellation request signal is input. A processing cancellation determination signal is supplied to the control circuit 241 from the cancellation determination circuit 242.

The control circuit 241 generates a control signal (a processing suspension signal or a processing cancellation signal)

with reference to a value of the processing cancellation determination signal, and supplies the generated control signal to the coprocessor arithmetic control circuit 21.

When the processing cancellation determination signal is the signal indicating suspension (the signal to determine that the coprocessor instruction currently being executed should be suspended), the control circuit 241 generates a processing suspension signal to instruct suspension of the coprocessor instruction being executed, and supplies the processing suspension signal to the coprocessor arithmetic control circuit 21. In addition to this, the control circuit 241 writes in the suspension state storing register 243 each value (for example, a number of a cycle being executed, a temporary value of arithmetic operation, a value written in a register, and a writing destination) of the processing status signal input from the cancellation determination circuit 242.

When the processing cancellation determination signal is the signal indicating cancellation (the signal to determine that the coprocessor instruction currently being executed can be canceled), the control circuit 241 generates a processing cancellation signal to instruct cancellation of the coprocessor instruction being executed, and supplies the processing cancellation signal to the coprocessor arithmetic control circuit 21.

A processing resumption request signal is input to the control circuit 241 from the processor core interrupt control circuit 12. According to this, the control circuit 241 supplies a processing resumption signal to the coprocessor arithmetic control circuit 21. In addition to this, the control circuit 241 reads a value of the suspension state storing register 243, and supplies the read value to the coprocessor arithmetic control circuit 21 as a status signal for resumption. As a result of this, the control circuit 241 restores an execution state of the coprocessor instruction.

The cancellation determination circuit 242 determines whether the coprocessor instruction currently being executed can be canceled, or should be suspended according to start indication of cancellation determination from the control circuit 241. The cancellation determination circuit 242 performs the determination according to the processing status signal supplied from the coprocessor arithmetic control circuit 21. As mentioned above, information, such as the number of steps currently being executed and whether or not data write has been performed to the storage section (the data memory 30 or an arbitrary register), is included in the processing status. The cancellation determination circuit 242 performs the determination, for example, according to whether or not data has been already written outside. When the value has been written in the storage section in an executed cycle, the cancellation determination circuit 242 determines that the coprocessor instruction currently being executed should be suspended. The cancellation determination circuit 242 supplies a determination result to the control circuit 241 and the processor core interrupt control circuit 22 as a processing cancellation determination signal. Furthermore, the cancellation determination circuit 242 supplies a processing status signal to the control circuit 241.

The suspension state storing register 243 stores a parameter used in the suspended coprocessor instruction being resumed.

Figure 3:
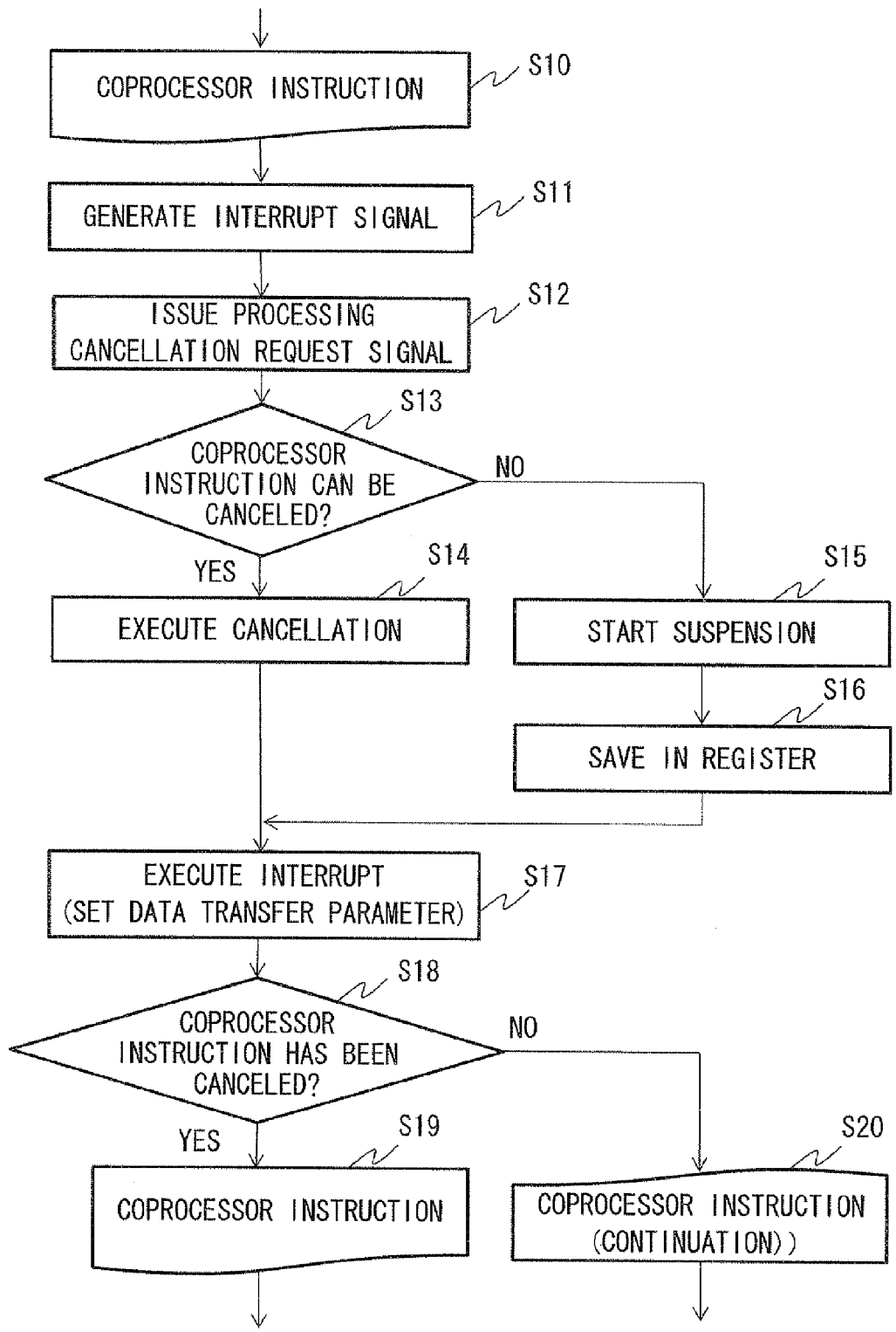
FIG. 3 is a flow chart showing processing of the deadlock avoidance mechanism pertaining to the embodiment 1.

Subsequently, there will be described operation of the deadlock avoidance mechanism 1 pertaining to the embodiment with reference to FIGS. 1 and 3. FIG. 3 is a flow chart showing a flow of processing from generation of an interrupt signal to end of interrupt processing in the deadlock avoidance mechanism 1.

The coprocessor arithmetic control circuit 21 controls execution of a coprocessor instruction (S10). In update of a data transfer parameter needing to be requested, the data transfer circuit 23 generates an interrupt signal. The data transfer circuit 23 supplies the generated interrupt signal to the processor core interrupt control circuit 12 in the processor core 10 (S11).

The processor core interrupt control circuit 12 to which the interrupt signal has been supplied receives a current status of the processor core from the program control circuit 11. When the status of the processor core is a status indicating that the coprocessor instruction is being executed, the processor core interrupt control circuit 12 supplies a processing cancellation request signal to the coprocessor interrupt control circuit 24 (S12).

The coprocessor interrupt control circuit 24 that has received the processing cancellation request signal receives a current processing status of the coprocessor 20 from the coprocessor arithmetic control circuit 21. The coprocessor arithmetic control circuit 21 decides from this processing status whether the coprocessor instruction currently being executed is canceled, or cannot be canceled (i.e., it is suspended) (S13).

When the coprocessor instruction currently being executed can be canceled (S13: Yes), the coprocessor interrupt control circuit 24 instructs cancellation of execution of the coprocessor instruction to the coprocessor arithmetic control circuit 21 (S14). Simultaneously with this, the coprocessor interrupt control circuit 24 supplies to the processor core interrupt control circuit 12 a processing cancellation determination signal indicating that cancellation was able to be performed.

Meanwhile, when the coprocessor instruction currently being executed cannot be canceled (S13: No), the coprocessor interrupt control circuit 24 instructs suspension of execution of the coprocessor instruction to the coprocessor arithmetic control circuit 21 (S15). Furthermore, the coprocessor interrupt control circuit 24 stores an execution state of the coprocessor instruction in the suspension state storing register 243 (S16). Simultaneously with this, the coprocessor interrupt control circuit 24 supplies to the processor core interrupt control circuit 12 a processing cancellation determination signal indicating that the coprocessor instruction has been suspended.

The processor core interrupt control circuit 12 that has received the processing cancellation determination signal stores a content of the determination. The processor core interrupt control circuit 12 then notifies the program control circuit 11 of the start of the interrupt processing. The program control circuit 11 starts execution of interrupt processing (S17). Namely, the program control circuit 11 notifies the coprocessor arithmetic control circuit 21 of interrupt processing. The coprocessor arithmetic control circuit 21 notifies the data transfer circuit 23 of the received interrupt processing. As a result of this, the data transfer parameter 231 is set in the interrupt processing.

When the interrupt processing is ended, the coprocessor arithmetic control circuit 21 stops supply of a wait signal to the program control circuit 11. The program control circuit 11 notifies the processor core interrupt control circuit 12 of the end of the interrupt processing. After this, the processor core interrupt control circuit 12 determines whether or not the coprocessor instruction has been canceled or has been suspended (S18). When the coprocessor instruction has been canceled (S18: Yes), the processor core interrupt control circuit 12 performs reissue of the canceled coprocessor instruction through the program control circuit 11 (S19). When the coprocessor instruction has been suspended (S18: No), the processor core interrupt control circuit 12 issues to the coprocessor interrupt control circuit 24 a processing resumption request signal to request resumption of the suspended coprocessor instruction.

When receiving the processing resumption request signal, the coprocessor interrupt control circuit 24 restores the execution state stored in the suspension state storing register 243, and instructs resumption of the suspended coprocessor instruction (S20).

Next, effects of the deadlock avoidance mechanism 1 pertaining to the embodiment will be described using FIGS. 8 and 3, while comparing execution of general interrupt processing with processing of the deadlock avoidance mechanism 1 pertaining to the embodiment.

Figure 8:
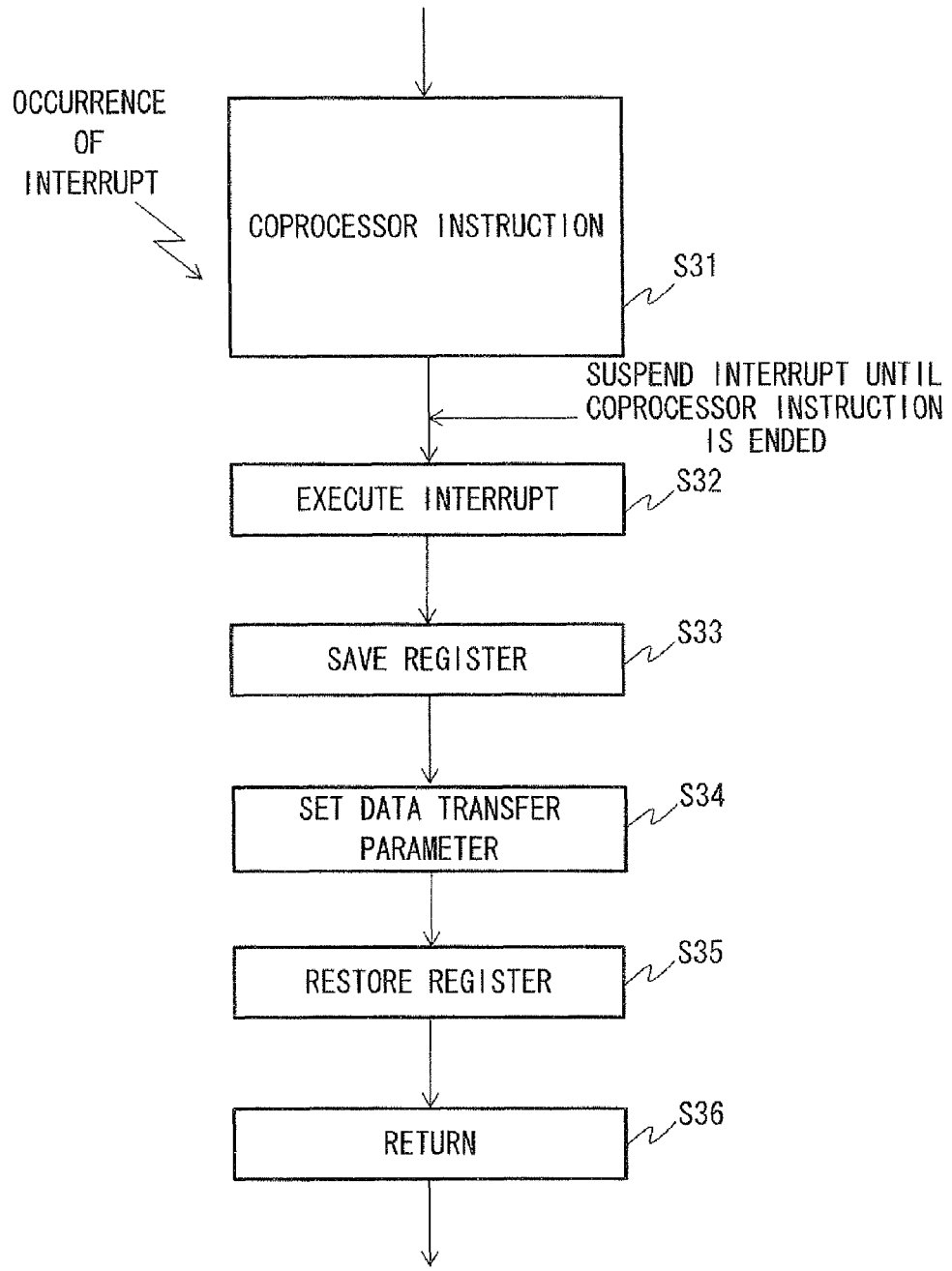
FIG. 8 is a flow chart which showing operation in a case of performing interrupt processing to the coprocessor.
Figure 9:
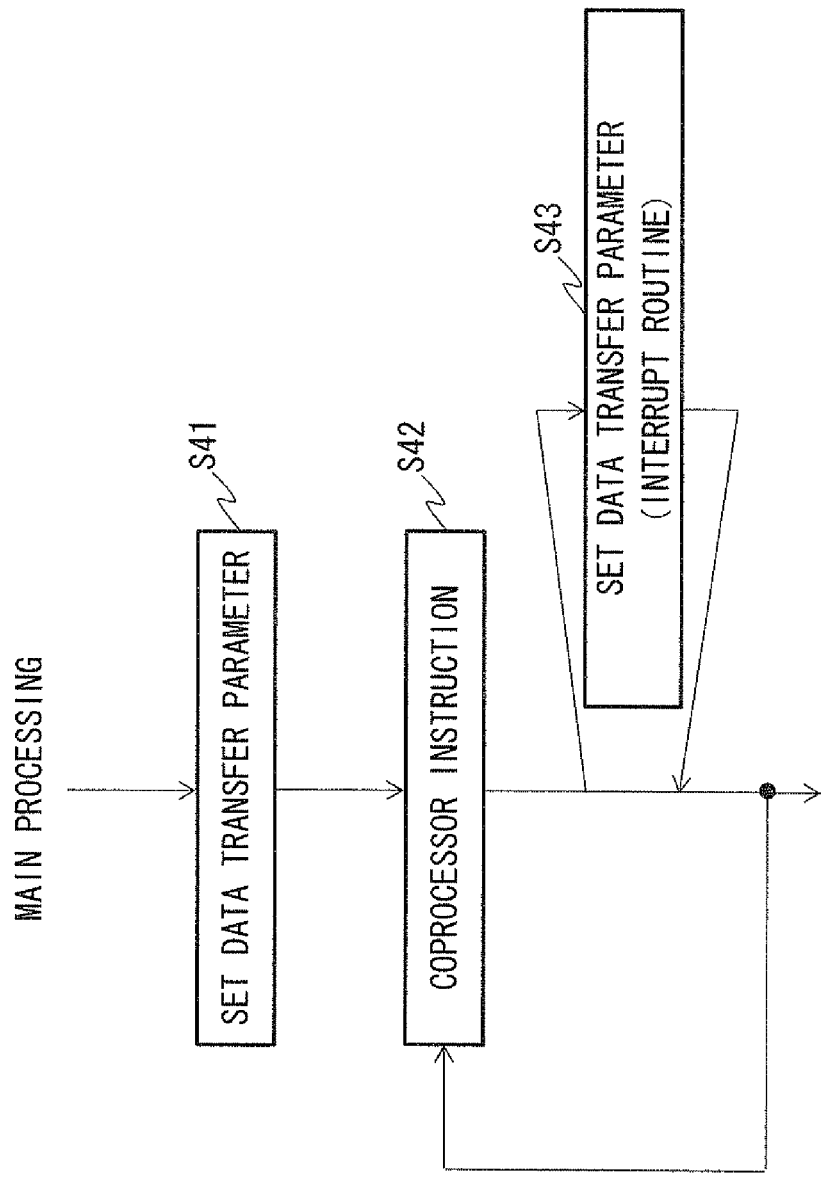
FIG. 9 is a flow chart showing a flow of processing in a case where setting of data transfer parameters is performed by interrupt processing.
Figure 10:
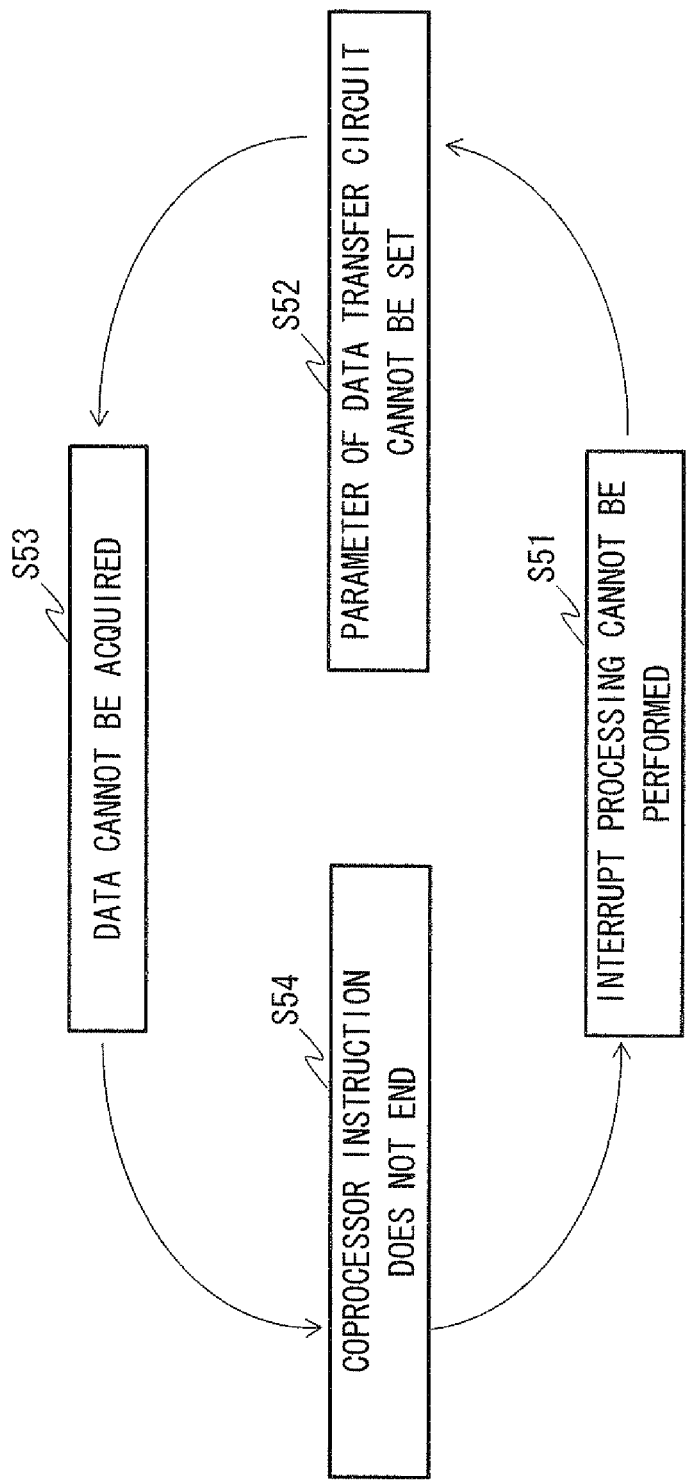
FIG. 10 is a conceptual diagram showing occurrence of deadlock.

FIG. 8 shows a flow of execution of general interrupt processing. When interrupt processing is issued during execution of a coprocessor instruction, the interrupt processing is executed after the program waits for the end of execution of the coprocessor instruction. By execution of the interrupt processing, a value of the register used for arithmetic operation is saved, and the transfer parameter 231 is reset to the data transfer circuit 23. The saved value of the register is then restored, and the program returns to execution of the coprocessor instruction.

Here, when execution of the coprocessor instruction cannot be ended unless after the data transfer parameter 231 is reset, interrupt processing cannot be executed. Namely, a deadlock state may occur.

FIG. 3 shows processing of the deadlock avoidance mechanism 1 pertaining to the embodiment. When interrupt processing is issued during execution of the coprocessor instruction, the deadlock avoidance mechanism 1 pertaining to the embodiment cancels or suspends the coprocessor instruction. After this, interrupt processing is immediately executed. When the coprocessor instruction is suspended, a processing status is saved in the suspension state storing register 243. The data transfer parameter 231 is then reset. After that, the coprocessor instruction is resumed using data saved in the suspension state storing register 243.

As described above, interrupt processing can be immediately executed before execution of the coprocessor instruction is ended. As a result of this, deadlock can be avoided.

When the coprocessor instruction is suspended, the deadlock avoidance mechanism 1 saves the execution state of the coprocessor instruction, in other words, writes it in the suspension state storing register 243. The deadlock avoidance mechanism 1 restores the saved execution state, and resumes the coprocessor instruction. Namely, the deadlock avoidance mechanism 1 can resume the coprocessor instruction from the execution state in the coprocessor instruction having been suspended. As a result of this, resource mismatch inside the coprocessor can be avoided. Resource mismatch does not occur at the time of cancellation of the coprocessor instruction.

Furthermore, as described with reference to FIG. 1, the deadlock avoidance mechanism 1 can reliably execute the coprocessor instruction issued once by reissuing the canceled coprocessor instruction.

As shown in the above-mentioned example, the deadlock avoidance mechanism 1 determines whether to cancel the coprocessor instruction according to whether or not a value has been written in the data memory 30 or the register. As a result of this, an illegal intermediate value can be prevented from remaining in the data memory 30 or the register by cancellation of the coprocessor instruction.

Figure 4:
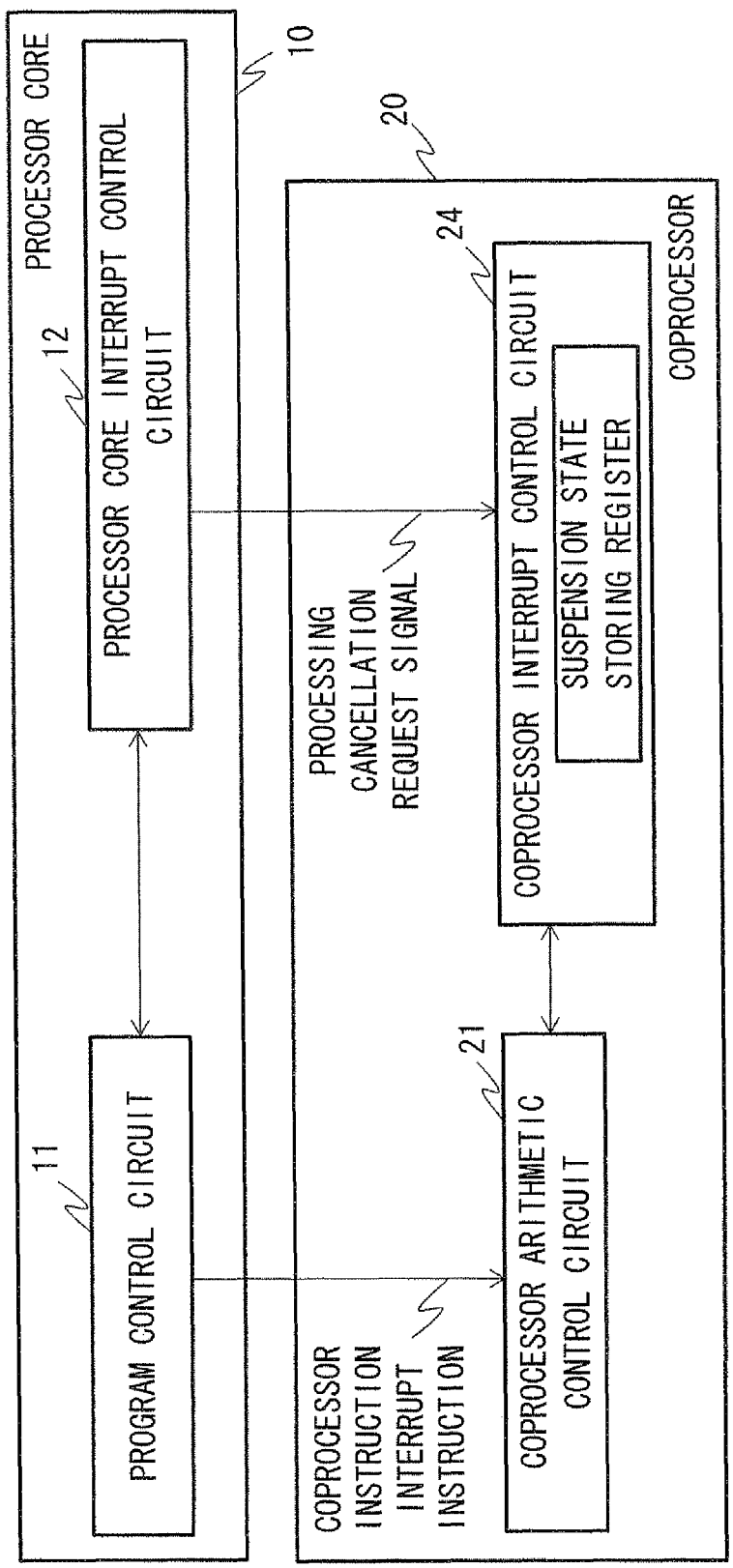
FIG. 4 is a block diagram showing the configuration of the deadlock avoidance mechanism pertaining to the embodiment 1.
Figure 5:
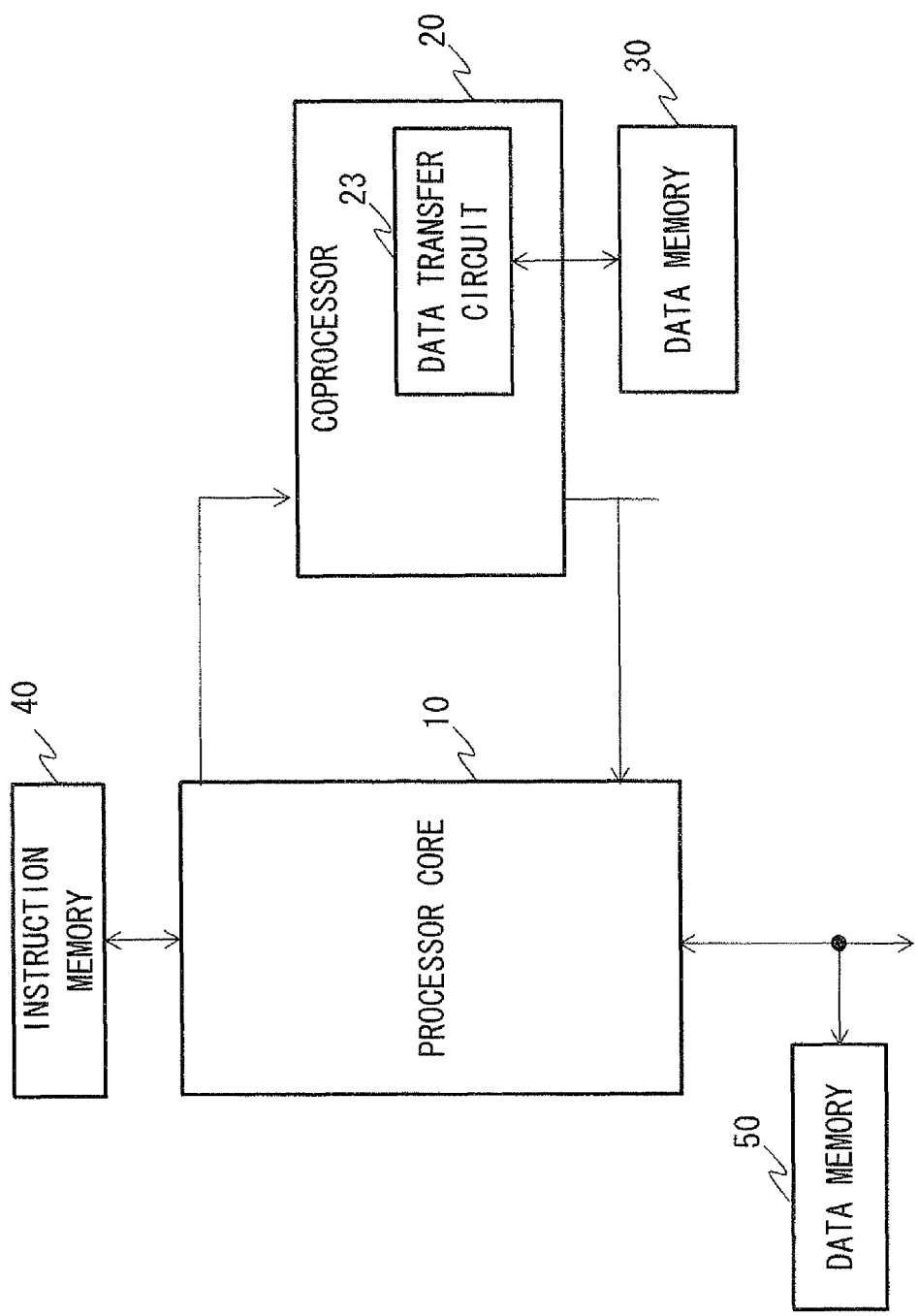
FIG. 5 is a block diagram showing a general configuration of LSI.
Figure 6:
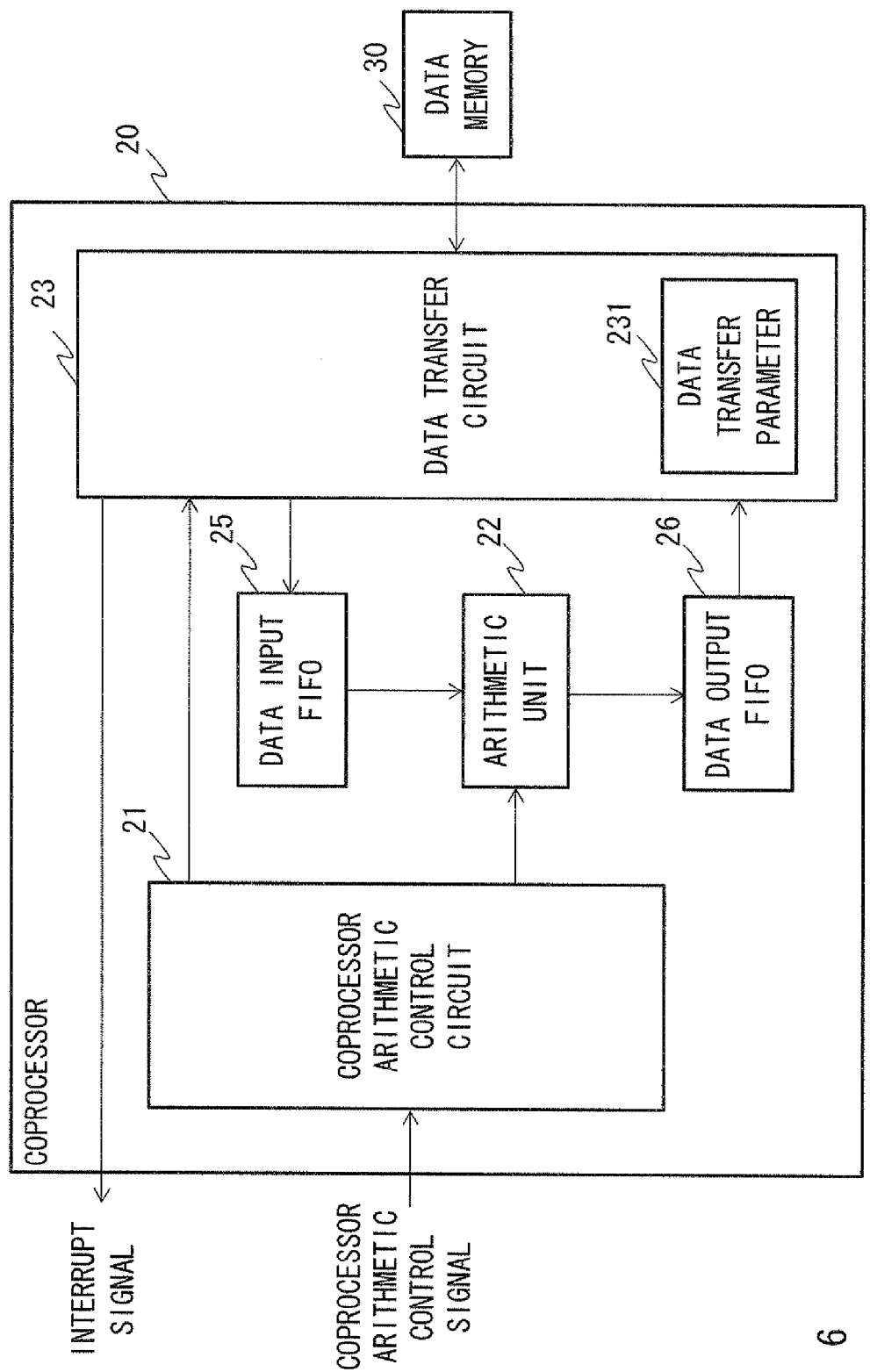
FIG. 6 is a block diagram showing a general configuration of a coprocessor.
Figure 7:
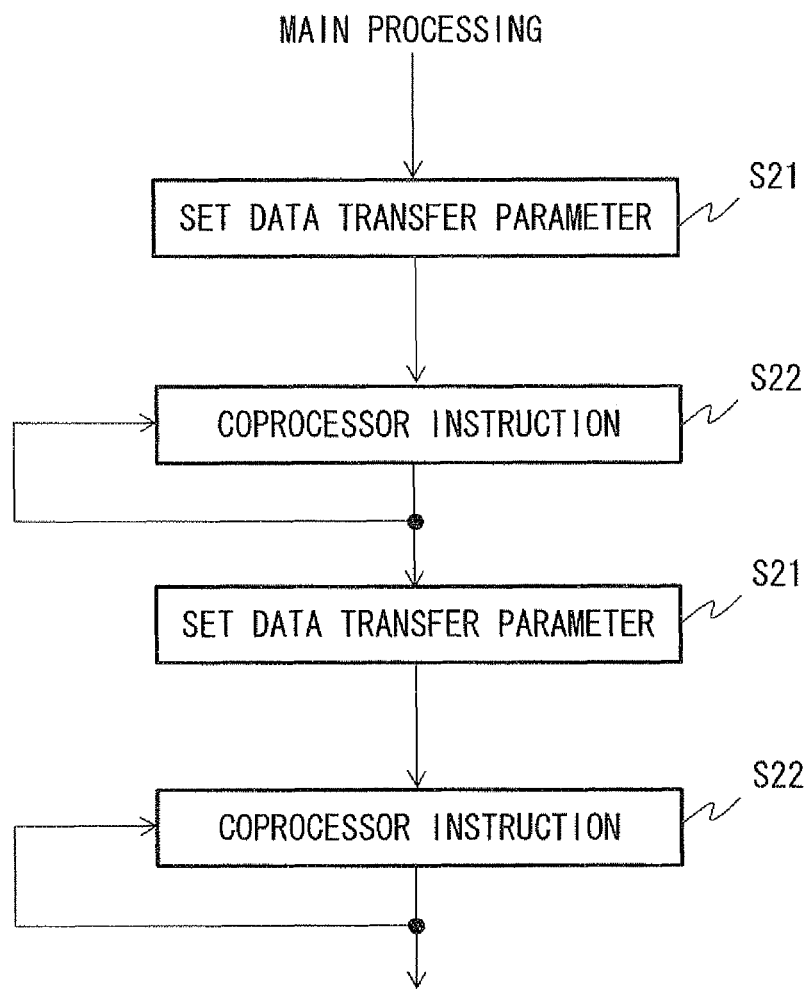
FIG. 7 is a flow chart showing a flow of processing in a case where setting of data transfer parameters is all performed by main processing.

Here, a schematic view of the present invention is shown in FIG. 4, and a configuration of the present invention will be described again. The processor core 10 includes: the program control circuit 11; and the processor core interrupt control circuit 12. The coprocessor 20 includes: the coprocessor arithmetic control circuit 21; and the coprocessor interrupt control circuit 24.

The processor core interrupt control circuit 12 issues a processing cancellation request signal to request cancellation of a coprocessor instruction being executed in the coprocessor 20. The program control circuit 11 issues interrupt processing after issuing a cancellation request. The coprocessor arithmetic control circuit 21 holds an execution state of the coprocessor instruction. In receiving a processing cancellation request signal, the coprocessor interrupt control circuit 24 performs cancellation or suspension of the coprocessor instruction based on execution state information that the coprocessor arithmetic control circuit 21 holds. The coprocessor interrupt control circuit 24 saves the execution state of the coprocessor instruction when suspending the coprocessor instruction, and restores the saved execution state of the coprocessor instruction after the end of the interrupt processing.

Even in a configuration of FIG. 4, interrupt processing can be promptly executed after the coprocessor instruction is canceled or suspended. When performing suspension, the coprocessor 20 saves the execution state of the coprocessor instruction, and restores the saved execution state of the coprocessor instruction after the end of the interrupt processing. As a result of this, interrupt processing can be immediately executed, and a problem of resource mismatch can be avoided.

It is to be noted that the present invention is not limited to the above-described embodiment, it can be appropriately changed without departing from the subject matter. For example, although the configuration including one coprocessor has been described in the above-mentioned example, the present invention can be adapted also to a semiconductor device including a plurality of coprocessors. In addition, although setting the data transfer parameter by interrupt processing has been described in the above-mentioned example, the present invention can be adapted also in a case of performing other processing by the interrupt processing.

INDUSTRIAL APPLICABILITY

An LSI for signal processing used for cell-phone terminals or AV equipment is included as a utilization example of the present invention.

This application claims priority based on Japanese Patent Application No. 2011-047907 filed on Mar. 4, 2011, and the entire disclosure thereof is incorporated herein.

REFERENCE SIGNS LIST

1 Deadlock avoidance mechanism
10 Processor core
11 Program control circuit
12 Processor core interrupt control circuit
20 Coprocessor
21 Coprocessor arithmetic control circuit
22 Coprocessor arithmetic unit
23 Data transfer circuit
231 Data transfer parameter
24 Coprocessor interrupt control circuit
241 Control circuit
242 Cancellation determination circuit
243 Suspension state storing register
30 Data memory

What is claimed is:

1. A deadlock avoidance method, wherein
   a cancellation request that requests cancellation of a coprocessor instruction being executed in a coprocessor is issued from a processor core, and
   when the coprocessor has received the cancellation request, in the coprocessor, whether the coprocessor instruction is canceled or suspended based on a processing status of the coprocessor instruction being executed is determined, the coprocessor instruction is canceled or suspended according to the determination, and the processing status of the coprocessor instruction is saved in the coprocessor instruction being suspended, after that, interrupt processing that performs processing to the coprocessor instruction is executed, and the saved processing status of the coprocessor instruction is restored after end of the processing.

2. The deadlock avoidance method according to claim 1, wherein the processor core re-executes the coprocessor instruction to which the cancellation has been made after end of the interrupt processing.

3. The deadlock avoidance method according to claim 1, wherein when the coprocessor instruction executes data write in a storage section, the coprocessor sets the coprocessor instruction as a target of suspension.

4. A deadlock avoidance mechanism comprising a processor core and a coprocessor, wherein
   the processor core comprises: a processor core interrupt control circuit that issues a cancellation request that requests cancellation of a coprocessor instruction being executed in the coprocessor; and
   a program control circuit that starts interrupt processing that performs processing to the coprocessor after issuance of the cancellation request, and wherein
   the coprocessor comprises: a coprocessor arithmetic control circuit that holds an processing status of the coprocessor instruction being executed; and
   a coprocessor interrupt control circuit that determines whether the coprocessor instruction is canceled or suspended based on a processing status that the coprocessor arithmetic control circuit holds in receiving the cancellation request from the program control circuit, cancels or suspends the coprocessor instruction according to the determination, saves the processing status of the coprocessor instruction when the coprocessor instruction is suspended, and restores the saved processing status of the coprocessor instruction after end of the interrupt processing.

5. The deadlock avoidance mechanism according to claim 4, wherein the program control circuit reissues the canceled coprocessor instruction.

6. The deadlock avoidance mechanism according to claim 4, wherein when the coprocessor instruction executes data write in a storage section, the coprocessor interrupt control circuit sets the coprocessor instruction as a target of suspension.

7. The deadlock avoidance mechanism according to claim 4, wherein
   the coprocessor comprises a data transfer circuit that generates an access address from a set parameter, and accesses a data memory using the access address, and
   the interrupt instruction includes processing that sets the parameter.

8. A semiconductor integrated circuit comprising the deadlock avoidance mechanism according to claim 4.

9. A cell-phone terminal or audio-visual equipment comprising the semiconductor integrated circuit according to claim 8.

* * * * *